(12) United States Patent
Ma et al.

(10) Patent No.: US 7,881,537 B2
(45) Date of Patent: Feb. 1, 2011

(54) AUTOMATED ACTIVITY DETECTION USING SUPERVISED LEARNING

(75) Inventors: Yunqian Ma, Roseville, MN (US); Michael E. Bazakos, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1144 days.

(21) Appl. No.: 11/343,658

(22) Filed: Jan. 31, 2006

(65) Prior Publication Data

US 2007/0177792 A1 Aug. 2, 2007

(51) Int. Cl.
G06K 9/46 (2006.01)
G06K 9/62 (2006.01)
G06K 9/00 (2006.01)

(52) U.S. Cl. .............. 382/190; 382/103; 382/115; 382/159; 382/224

(58) Field of Classification Search ............. 382/155, 382/159, 224–228; 706/10, 12, 13
See application file for complete search history.

(56) References Cited

U.S. PATENT DOCUMENTS

| | | | |
|---|---|---|---|
| 5,559,895 A * | 9/1996 | Lee et al. .............. | 382/119 |
| 5,596,994 A | 1/1997 | Bro | |
| 5,634,008 A | 5/1997 | Gaffaney et al. | |
| 5,828,809 A | 10/1998 | Chang et al. | |
| 5,969,755 A | 10/1999 | Courtney | |
| 5,974,235 A | 10/1999 | Nunally et al. | |
| 6,272,479 B1 * | 8/2001 | Farry et al. .............. | 706/13 |
| 6,359,647 B1 | 3/2002 | Sengupta et al. | |
| 6,424,370 B1 | 7/2002 | Courtney | |
| 6,570,608 B1 * | 5/2003 | Tserng .............. | 348/143 |

(Continued)

FOREIGN PATENT DOCUMENTS

JP 2000-276577 A 10/2000

(Continued)

OTHER PUBLICATIONS

Mori, T., et al. (May 2004) "Hierarchical recognition of daily human actions based on continuous hidden Markov models." Proc. 6$^{th}$ IEEE Int'l Conf. on Automatic Face and Gesture Recognition (FGR'04), pp. 779-784.*

(Continued)

Primary Examiner—Brian P Werner
Assistant Examiner—Barry Drennan
(74) Attorney, Agent, or Firm—Schwegman, Lundberg & Woessner, P.A.

(57) ABSTRACT

In an embodiment, one or more sequences of learning video data is provided. The learning video sequences include an action. One or more features of the action are extracted from the one or more sequences of learning video data. Thereafter, a sequence of operational video data is received, and the one or more features of the action from the sequence of operational video data is extracted. A comparison is then made between the extracted one or more features of the action from the one or more sequences of learning video data and the one or more features of the action from the sequence of operational video data. In an embodiment, this comparison allows the determination of whether the action is present in the operational video data.

20 Claims, 3 Drawing Sheets

U.S. PATENT DOCUMENTS

| | | | |
|---|---|---|---|
| 6,628,835 | B1 | 9/2003 | Brill et al. |
| 6,721,454 | B1 | 4/2004 | Qian et al. |
| 6,845,357 | B2 | 1/2005 | Shetty et al. |
| 6,879,709 | B2 | 4/2005 | Tian et al. |
| 7,076,102 | B2 | 7/2006 | Lin et al. |
| 7,106,885 | B2 | 9/2006 | Osterweil et al. |
| 2003/0051026 | A1 | 3/2003 | Carter et al. |
| 2003/0058340 | A1* | 3/2003 | Lin et al. .................... 348/159 |
| 2003/0058341 | A1* | 3/2003 | Brodsky et al. ............. 348/169 |
| 2003/0088412 | A1* | 5/2003 | Shetty et al. ................ 704/243 |
| 2003/0123703 | A1 | 7/2003 | Pavlidis et al. |
| 2004/0080615 | A1 | 4/2004 | Klein et al. |
| 2004/0228503 | A1* | 11/2004 | Cutler ........................ 382/103 |
| 2006/0053342 | A1 | 3/2006 | Bazakos et al. |
| 2006/0233461 | A1 | 10/2006 | Ma et al. |

FOREIGN PATENT DOCUMENTS

| | | |
|---|---|---|
| WO | WO-01/63576 A2 | 8/2001 |

OTHER PUBLICATIONS

Masoud, O., et al. (May 2003) "A method for human action recognition." Image and Vision Computing, vol. 21 No. 8, pp. 729-743.*

Martinez et al. (Feb. 2001) "PCA versus LDA." IEEE Trans. on Pattern Analysis and Machine Intelligence. vol. 23 No. 2, pp. 228-233.*

Sahiner et al. (Oct. 1996) "Image feature selection by a genetic algorithm: application to classification of mass and normal breast tissue." Medical Physics, vol. 23 No. 10, pp. 1671-1684.*

Pers et al. (Sep. 2003) "Scale-based human motion representation for action recognition." Proc. 3rd IEEE Int'l Symp. on Image and Signal Processing and Analysis.*

Yang et al. (Mar. 1998) "Feature subset selection using a genetic algorithm." IEEE Intelligent Systems, vol. 13 No. 2, pp. 44-49.*

Gasser et al. (Apr. 2004) "Human activities monitoring at bus stops." Proc. 2004 IEEE Int'l Conf. on Robotics and Automation.*

Wang et al. (Nov. 2002) "Recent developments in human motion analysis." Pattern Recognition vol. 36, pp. 585-601.*

Lipton, A. J., et al., "Critical Asset Protection, Perimeter Monitoring, and Threat Detection Using Automated Video Surveillance", [online]. [archived Dec. 10, 2004]. Retrieved from the Internet: <URL: http://web.archive.org/web/20041210102524/www.objectvideo.com/downloads/IVS_whitepaper.pdf>, (2004), 1-11.

Lipton, A. J., "Object/Video Forensics: Activity-Based Video Indexing and Retrieval for Physical Security Applications", [online]. [archived Jul. 31, 2004]. Retrieved from the Internet: <URL: http://web.archive.org/web/20040731043902/ objectvideo.com/downloads/Forensics_Whitepaper.pdf>, (2004), 18 pgs.

Medioni, G., et al., "Event Detection and Analysis from Video Streams", *IEEE Transactions on Pattern Analysis and Machine Intelligence*, 23(8), (2001), 873-889.

Porikli, F., et al., "Even Detection by Eigenvector Decomposition Using Object and Frame Features", *IEEE Computer Society Conference on Computer Vision and Pattern Recognition Workshops (CVPRW '04)*, (2004), 10 pgs.

* cited by examiner

AUTOMATED ACTIVITY DETECTION USING SUPERVISED LEARNING

TECHNICAL FIELD

Various embodiments relate to video surveillance and analysis, and in an embodiment, but not by way of limitation, a system and method for automated activity detection using supervised learning.

BACKGROUND

Video surveillance is used extensively by commercial and industrial entities, the military, police, and government agencies. Years ago, video surveillance involved simple closed circuit television images in an analog format in combination with the human monitoring thereof. Video surveillance has since progressed to the capture of images, the digitization of those images, the analysis of those images, and the prediction and the responses to events in those images based on that analysis. While the current state of the art is somewhat adept at such things as motion detection, tracking, and object classification, current systems require the specific definition of an environment or scenario, and this requirement unnecessarily restricts the use of such a surveillance system. The art is therefore in need of a different approach for video surveillance and monitoring.

SUMMARY

In an embodiment, one or more sequences of learning video data are provided. The learning video sequences include an action. One or more features of the action are extracted from the one or more sequences of learning video data. Thereafter, a reception of a sequence of operational video data is enabled, and an extraction of the one or more features of the action from the sequence of operational video data is enabled. A comparison is then enabled between the extracted one or more features of the action from the one or more sequences of learning video data and the one or more features of the action from the sequence of operational video data. In an embodiment, this comparison allows the determination of whether the action in present in the operational video data.

DETAILED DESCRIPTION

Figure 1:
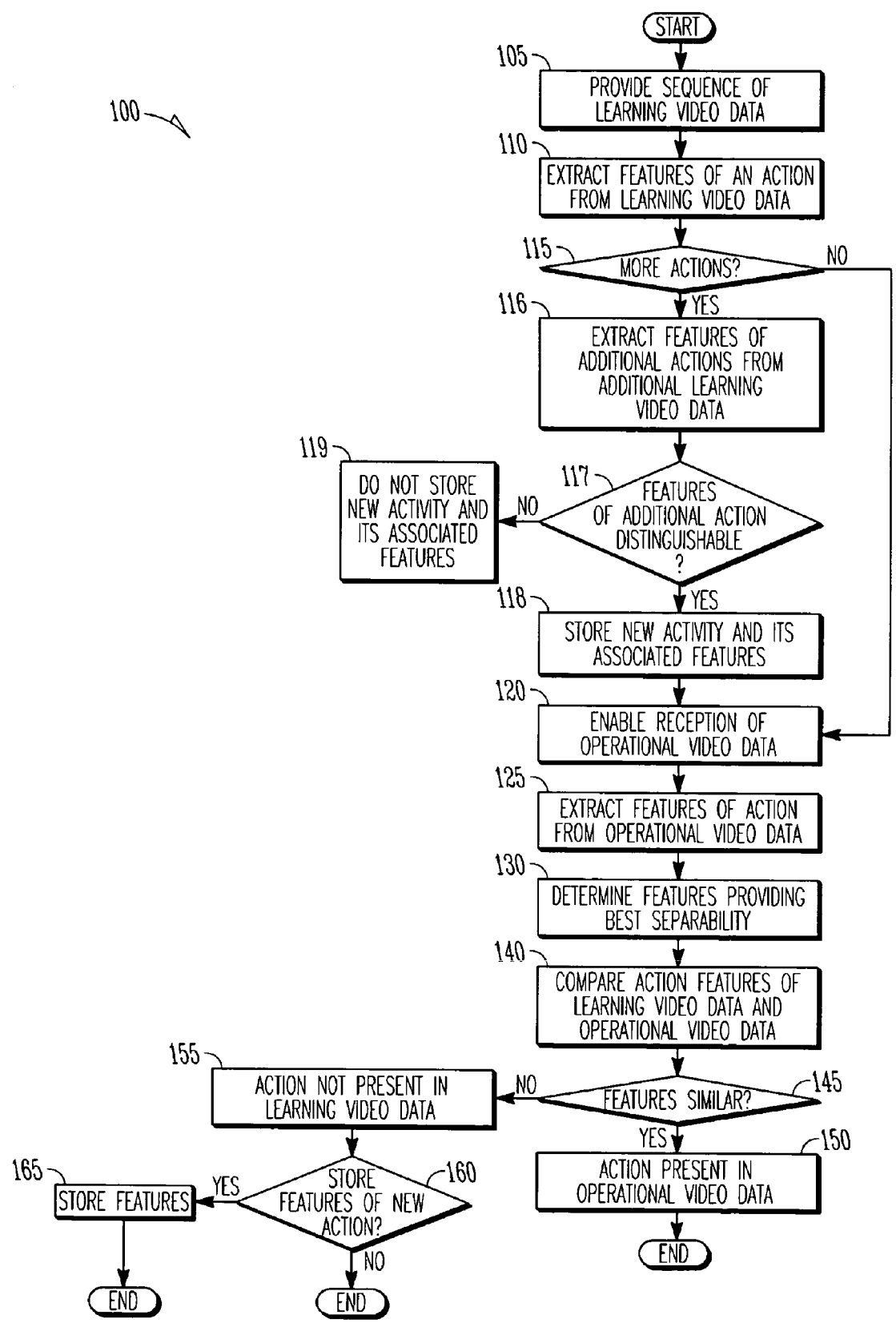
FIG. 1 illustrates a example embodiment of a system and process to automate an activity detection system using supervised learning.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 illustrates an example embodiment of a system and process 100 that automates activity detection via supervised learning. U.S. patent application Ser. No. 10/938,244, filed on Sep. 9, 2004, and assigned to the Assignee of the present application, pertains to the Unsupervised Learning of Events in a Video Sequence, and the content of that application is hereby incorporated in its entirety for all purposes. Referring now to FIG. 1, an operation 105 provides one or more sequences of learning video data that include one or more actions. A video motion detection algorithm may provide the learning video data. These one or more actions are actions that the operators of the system would like to be able to identify in operational video data. Operational video data are non-contrived real-life video sequences analyzed by the system when the system or process 100 is placed into operation. The learning video data sequences are generated by recording orchestrated scenarios, such as a person falling or a person loitering, to learn about and extract at operation 110 the identifiable features of these actions. Once these features are identified and quantified using the learning video data, operational video data may be analyzed to determine if any of these actions are present in the operational video data.

Before the extraction of the features from the learning video data, it is determined what features of the desired action are important to monitor. This is called feature selection. For example, it may be determined that the important spatio-temporal features that are indicative of a person loitering include certain localized and repeatable motions of a blob (blob is the binary image of the person being tracked), such localized and repeatable motions at a certain velocity, and the duration of such localized and repeatable motions. As one of skill in the art will readily realize, the features indicative of any action may be identified, and then extracted from learning video data sequences to teach a system about that action.

In an embodiment, any number of actions may be taught to the system. At operation 115, it is determined whether there are more actions to identify. If there are no further actions for the system to learn, the system is ready to be placed into operation at 120. However, if the system is designed to learn and be able to detect multiple activities, the process 100 extracts features of additional actions from additional learning video data at operation 116. The process then determines at 117 whether the pertinent features of any new action are distinguishable from the features of other actions. If at least one feature of a candidate activity is distinguishable from the same feature of all other activities that are presently recognizable by the system, that activity and its associated features are determined to be learned by the system and stored at block 118. For example, if the system is designed to differentiate between the actions of running and walking, and then it is requested that the system also identify a person who is falling or who has fallen, at least the height and width of a blob representing a person who is falling or who has fallen is distinguishable from the height and width of a blob representing a person who is walking or running. If the values (numbers) of the features of a candidate activity are too close and therefore not distinguishable from an activity already present within such a system, that activity and its features are not stored by the system (119). In this case, the result is that the system will not be able to identify that action and it is not stored in the system yet. In this case there is an option to present to the system another video sequence of the same action, collected under different conditions, for example at a closer range or from a different angle, and repeat the process of feature extraction and comparison.

The determination at operation 117 that a new candidate activity is distinguishable from all other activities (via the features of these activities) may be determined by any of several classifier designs known to those of skill in the art. Such classifier designs include best fit equations, hierarchal data tree structures, and data clouds. Whether one or more of these particular classifier designs are used, or some other classifier design or designs, the application of any such classifier design tool generates a measurable degree of separability between one or more features of each activity.

After the learning phase (operations 105-119), the process 100 is ready to receive operational data at 120. The operational data may be captured by any type of video sensor, and the video sensor may be placed in any environment for which there is a desire to monitor actions including parking lots, places of business, government facilities, public transportation facilities, and sports facilities, just to name a few. In an embodiment, the video sensor includes at least a motion detection algorithm, which identifies blobs in the field of view for which the activity thereof is to be determined. The video sensor may also employ tracking and object classification algorithms depending on the needs of the system.

After receiving the operational video data at 120, the process extracts features from that operational video data at 125. The features extracted from the blob from the video motion detector assist in determining if any of the features that have been learned by the process 100 are present in the operational video data. For example, if the process has learned to detect a person falling down, the features that the process 100 may look for in a moving blob are that of a certain height and width (indicating that the moving blob is a person), which then ceases its motion, and changes in both its height and width, and the rate of change of height to width ratio, as well as the rate of change of the angle of the blob's longitudinal axis from the vertical position—thereby indicating that such a blob may be a person who has fallen.

In an embodiment, $x_i$ may be represent sample data at a specific instant in time (a frame). There may be many sample data, so $x_i$, i=1, ..., n where n is the number of samples. Then, for each sample, $x_i \in R^d$, each sample data has d features. That is, $$x_i = \{x_i^1, x_i^2, \ldots, x_i^d\} \quad (1)$$

where d equals the total number of features for each sample data. The feature vector $x_i$ may include the features associated with the tracked actor (blob) as well as features relating to other actors and/or static background objects within the image sequence. In certain embodiments, for example, the feature vector $x_i$ may include information regarding the distance between the tracked actor and other actors detected by the video surveillance system.

In an embodiment, the process at operation 130 determines the features that provide the best separability between the features of the operational video data and the learned video data. In an embodiment, such a determination is implemented with a genetic algorithm or similar algorithm which is known to those of skill in the art. As an example, such a genetic algorithm is capable of determining that if the process 100 is trying to differentiate between the actions of walking and running, the feature most likely to assist in this determination, that is, the feature providing the best separability, would be the velocity of the blob, rather than the height and width aspects of the blob. Simply put, the height and width ratio of a blob is substantially similar for both running and walking, while the velocity of the blob for running and walling is most likely distinguishable.

The following example illustrates the distinguishable activities of walking and running. In this example, there are two centers (of data points) as follows:

$$c_1 = \{c_1^1, c_1^2, \ldots, c_1^d\} \text{ represent walking}$$
$$c_2 = \{c_2^1, c_2^2, \ldots, c_2^d\} \text{ represent running}$$

$$\text{Where } c_1 = \frac{1}{n_{walking\_data}} \sum_{i=1}^{n_{walking\_data}} x_i \quad (2)$$

$$c_2 = \frac{1}{n_{running\_data}} \sum_{i=1}^{n_{running\_data}} x_i \quad (3)$$

Figure 3:
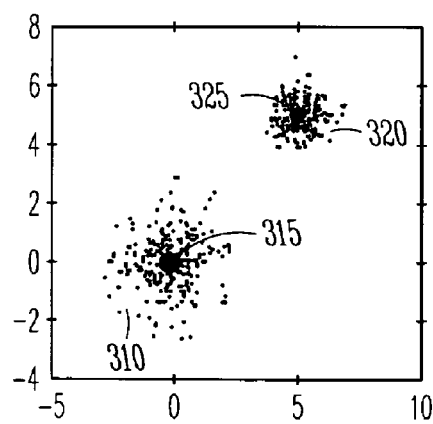
FIG. 3 illustrates an example of two data clusters representing two separate activities.

FIG. 3 illustrates an example embodiment of two such centers of data. In FIG. 3, a cluster of data 310 has a center 315, and a cluster of data 320 has a center of data 325. Consequently, FIG. 3 illustrates that a center 315 that may represent walking, can be distinguished from a center 325 that may represent running.

After the determination that two clusters are distinguishable, in an embodiment, the next step is a labeling process during which a user provides feedback to the system and confirms that the different cluster represents a different (the new) event/activity. For example, for a running event and a walking event, for each sample data $x_i = \{x_i^1, x_i^2, \ldots, x_i^d\}$, there is an associated $y_i = \{-1, +1\}$, so if $x_i = \{x_i^1, x_i^2, \ldots, x_i^d\}$ belongs to the running event, then $y_i = -1$, and if $x_i = \{x_i^1, x_i^2, \ldots, x_i^d\}$ belongs to the walking event, then $y_i = +1$.

The above labeling process by the user is a supervised part of the learning process. After the manual labeling, the computer system will know the actual feature values that represent the event, so it can conclude the supervised learning process—that is, the training phase for this activity.

For the above running and walking example, the supervised learning is considered a standard (binary) classification problem.

After the labeling process, there is a finite sample data set $(x_i, y_i)$, i=1, ..., n, where x is an input (feature) vector $x \in R^d$ and $y \in \{-1, 1\}$ is a class label. The goal is to estimate the mapping (indicator function) $x \rightarrow y$ in order to classify future samples. An example is the linear discriminant function $f(x, \phi) = \text{sign}(g(x, \phi))$ where $g(x, \phi) = w \cdot x + b$. Parameters (weights) are w and b (bias parameter). A decision boundary $g(x, \phi) = 0$ corresponds to d−1 dimensional hyperplane in a d-dimensional input space. Various statistical and neural network classification methods have been developed, and are known to those of skill in the art, for estimating flexible (nonlinear) decision boundaries with finite data.

Figure 2:
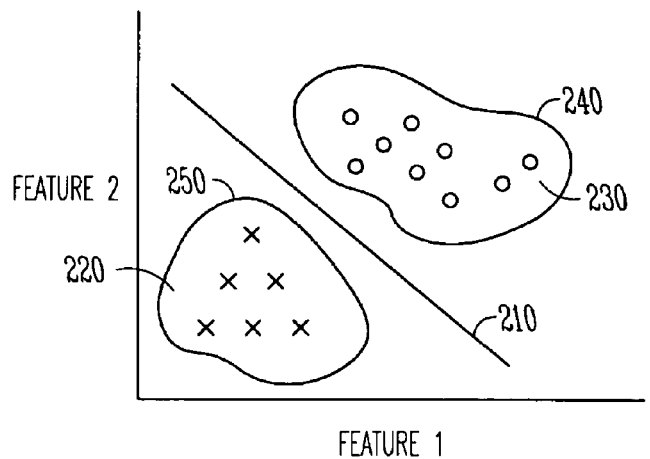
FIG. 2 illustrates an example embodiment of a two dimensional classifier design.

At operation 140, the features extracted from the operational video data (at operation 125) are compared against the features of the actions learned by the system in the learning steps 105-119 of process 100. As disclosed supra, in an embodiment, this comparison is executed using one or more of several classifier designs known in the art. For example, as illustrated in FIG. 2, a best fit line approach may be used. In such an approach, the values of two features of two or more activities (e.g., activities 220 and 230 in FIG. 2) are plotted on an x-y plane. Specifically, in FIG. 2, a Feature 1 which may represent the height of a blob, and Feature 2, which may represent the velocity of the blob, are plotted against each other. A best fit line 210 is generated that separates the data of the two or more activities. After the generation of the best fit line, the values of these features from the incoming operational video data are input into the equation for the best fit line 210. The result of that calculation will likely fall on one side of the line or the other, thereby providing some evidence that the incoming activity, at least for these two features (Feature 1 and Feature 2), is more likely one activity (e.g., 220) rather than another activity (e.g., 230). While this example uses only a two dimensional graph representing two features and two activities, an analysis involving many dimensions may be performed using multiple graphs representing many features and many activities. Additionally, if need be, higher order equations may be used.

Similarly, a classifier design using data clouds could be used in another embodiment. Data clouds are generated using the features of the learned activities, an example of which is illustrated in FIG. 2 by lines 240 and 250 that encompass the features of the two plotted activities 230 and 220 respectively. Values are then calculated for the same features in the operational video data, and it is determined whether the features of the operational video data fall within one of the clouds. For a linear classifier, it is determined that:

$$g(x, \phi) = w \cdot x + b \text{ is } >0 \text{ or } <0,$$

if $g(x, \phi) = w \cdot x + b$ is $>0$, then the test data x belongs to class 1, for example a walking class;
if $g(x, \phi) = w \cdot x + b$ is $<0$, then the test data x belongs to class $-1$, for example a running class.

This is then indicative that the feature is in the operational video data, and provides some evidence that the activity represented by this feature may be present in the operational video data. Once again, the data clouds of FIG. 2 are just an example of two features of two activities. A variety of features may be analyzed using a multi-dimensional analysis.

Figure 4:
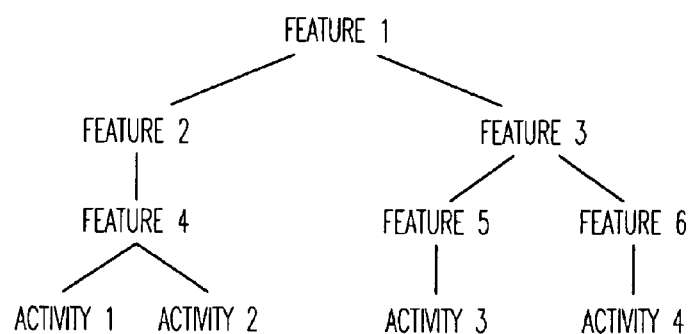
FIG. 4 illustrates an example embodiment of a hierarchical tree structure that may be used in connection with one or more embodiments of the invention.

Another classifier design that could be used includes a hierarchical tree structure. FIG. 4 illustrates an example of such a tree structure. The tree is constructed such that the values of features are placed at the decision points in a tree, and each node at the bottom of the tree represents an activity. For example, in FIG. 4, Feature 1 may represent the height of a blob from the operational video data. If the height of the blob is between a certain minimum and maximum, the process may branch off to feature 2, indicating that the blob may be a person. Feature 2 may be the width of the blob, and if the width is within a certain range, it can then be assumed with a certain degree of certainty that the blob is a person. Then, Feature 4 may be examined, and if the blob is moving at a certain velocity or less, then it is determined that activity 1 is applicable, indicating that the person is walking. Alternatively, if the blob is moving with a velocity that is greater than a threshold velocity, it may be determined that activity 2 is applicable, indicating that that person is running.

For feature selection, a selection is made from a large superset of useful features $x_i = \{x_i^1, x_i^2, \ldots, x_i^d\}$, wherein the superset covers all the anticipated activities in which a user may be interested (e.g., from d=40 features). This is a rather high dimension in the feature space. Therefore, the feature selection process for a specific activity means that p features are selected from d features, where $p \leq d$. For example, for a specific activity y, only 5 features may be selected from the 40 available features. However, for a different activity, any 20 features may be selected from the 40 features. Thereafter, the supervised learning task is performed.

Notwithstanding the particular classifier design that is used, a determination is made at decision block 145 whether the features of the operational video are similar to the features of one of the learned activities of the process 100. If enough features are similar, it can be determined that the activity of the operational video data is the same as the learned activity at operation 150. If the features of the activity of the operational video data are not similar to any of the features of the learned activities, then the system determines at operation 155 that the activity in the operational video data is not one of the learned activities. After the determination at operation 155 that the action of the operational video data is not present in any of the learned video data, a decision may be made, preferably by an operator of the process, at operation 160, whether this is an action where there is an interest in storing the features. If it is, the feature of this new activity may be stores at operation 165, and later used to identify that activity in any future operational video data.

Figure 5:
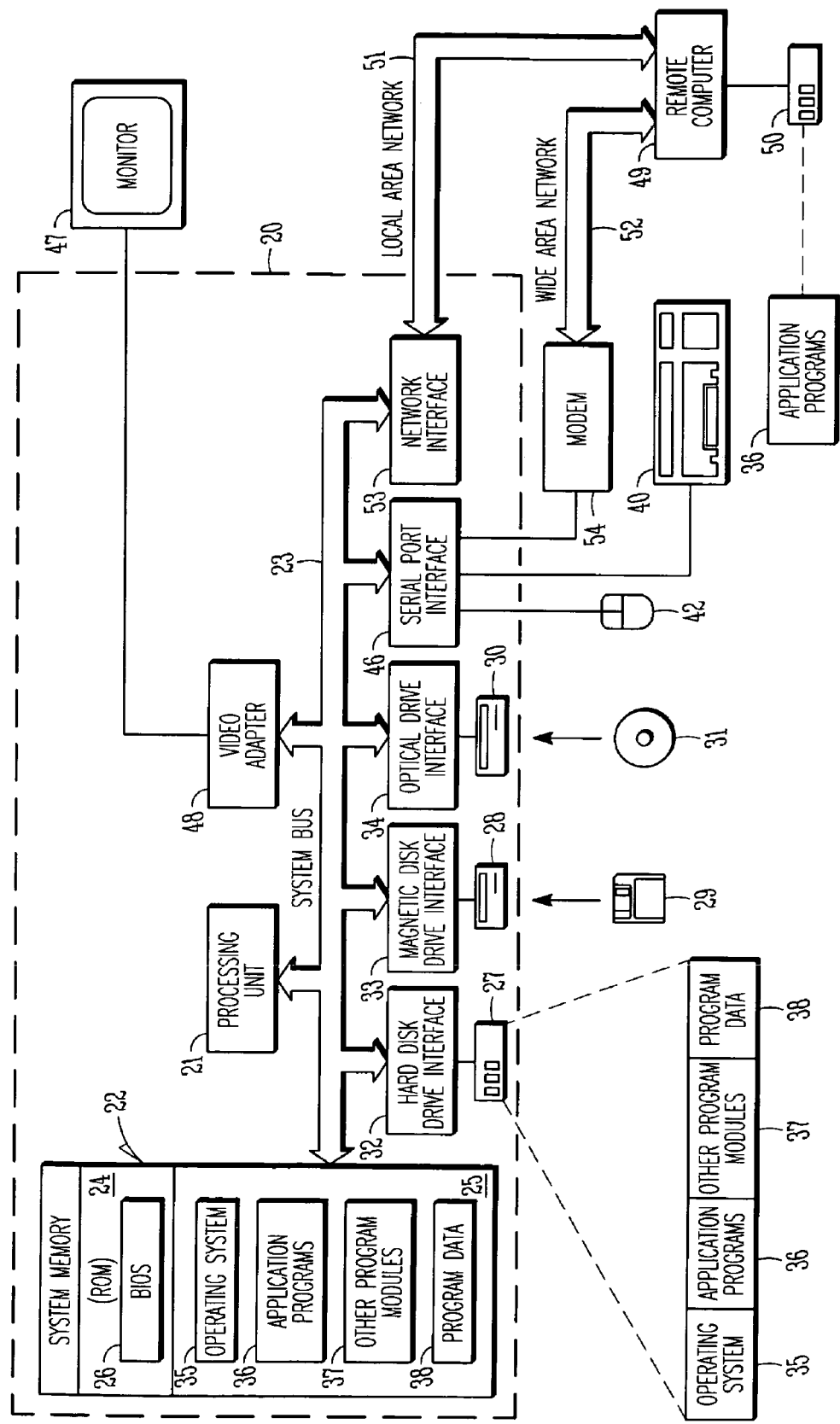
FIG. 5 illustrates an example embodiment of a computer system upon which one or more embodiments of the invention may operate.

FIG. 5 is an overview diagram of a hardware and operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims. In an embodiment, one or more sequences of learning video data is provided. The learning video sequences include an action. One or more features of the action are extracted from the one or more sequences of learning video data. Thereafter, a sequence of operational video data is received, and the one or more features of the action from the sequence of operational video data is extracted. A comparison is then made between the extracted one or more features of the action from the one or more sequences of learning video data and the one or more features of the action from the sequence of operational video data. In an embodiment, this comparison allows the determination of whether the action is present in the operational video data.

The invention claimed is:

1. A method comprising:
providing to a processor one or more first sequences of learning video data for each of a plurality of actions;
identifying and tracking blobs within said learning video data;
extracting using the processor one or more features from said identified blobs for each of said plurality of actions;
determining using the processor whether at least one extracted feature of one of said plurality of actions provides a discrimination from all other of said plurality of actions;
when none of said extracted features of said one of said plurality of actions provides a discrimination from all other of said plurality of actions, providing a second sequence of learning video data for said one of said plurality of actions, said second sequence of learning video data captured under different conditions than said first sequence of learning video data;
receiving at the processor a sequence of operational video data;
identifying and tracking blobs within said operational video data;
extracting using the processor one or more features from said identified blobs in said sequence of operational video data; and
comparing using the processor said at least one extracted feature of one of said plurality of actions and said one or more features from said sequence of operational video data.

2. The method of claim 1, wherein said comparison comprises a classifier design to determine whether said sequence of operational video data includes said at least one extracted feature.

3. The method of claim 2, wherein said classifier design includes one or more of a best fit equation, a hierarchical tree structure, and a summation of data clouds.

4. The method of claim 1, further comprising storing said at least one extracted feature of one of said plurality of actions.

5. The method of claim 4, further comprising:
receiving a plurality of sequences of operational video data;
extracting one or more features of an action from said plurality of sequences of operational video data;
determining that said one or more features of said action represent an action that is not identifiable as one of said plurality of actions; and
storing said extracted features of said action.

6. The method of claim 4, further comprising:
receiving a sequence of operational video data;
comparing said one or more features extracted from said learning video data for each of said plurality of actions with said sequence of operational video data; and
determining one or more features that best differentiate said sequence of operational video data from said learning video data.

7. The method of claim 6, wherein said comparing said one or more features extracted from said learning video data for each of said plurality of actions with said sequence of operational video data and said determining one or more features that best differentiate said sequence of operational video data from said learning video data comprise a genetic algorithm.

8. A system comprising:
a processor configured to provide one or more first sequences of learning video data for each of a plurality of actions;
a processor configured to identify and track blobs within said learning video data;
a processor configured to extract one or more features from said identified blobs for each of said plurality of actions;
a processor configured to determine whether at least one extracted feature of one of said plurality of actions provides a discrimination from all other of said plurality of actions;
a processor configured to provide, when none of said extracted features of said one of said plurality of actions provides a discrimination from all other of said plurality of a second sequence of learning video data for said one of said plurality of actions, said second sequence of learning video data captured under different conditions than said first sequence of learning video data;
a processor configured to receive a sequence of operational video data;
a processor configured to identify and track blobs within said operational video data;
a processor configured to extract one or more features from said identified blobs in said sequence of operational video data; and
a processor configured to compare said at least one extracted feature of one of said plurality of actions and said one or more features from said sequence of operational video data.

9. The system of claim 8, wherein said comparison comprises a classifier design to determine whether said sequence of operational video data includes said at least one extracted feature.

10. The system of claim 9, wherein said classifier design includes one or more of a best fit equation, a hierarchical tree structure, and a summation of data clouds.

11. The system of claim 8, further comprising a processor configured to store said at least one extracted feature of one of said plurality of actions.

12. The system of claim 11, further comprising:
a processor configured to receive a plurality of sequences of operational video data;
a processor configured to extract one or more features of an action from said plurality of sequences of operational video data;
a processor configured to determine that said one or more features of said action represent an action that is not identifiable as one of said plurality of actions; and
a processor configured to store said extracted features of said action.

13. The system of claim 11, further comprising:
a processor configured to receive a sequence of operational video data;
a processor configured to compare said one or more features extracted from said learning video data for each of said plurality of actions with said sequence of operational video data; and
a processor configured to determine one or more features that best differentiate said sequence of operational video data from said learning video data.

14. The system of claim 13, wherein said comparison of said one or more features extracted from said learning video data for each of said plurality of actions with said sequence of operational video data and said determination of one or more features that best differentiate said sequence of operational video data from said learning video data comprise a genetic algorithm.

15. A non-transitory machine-readable medium having instructions that when executed by a processor execute a method comprising:
providing one or more first sequences of learning video data for each of a plurality of actions;
identifying and tracking blobs within said learning video data;
extracting one or more features from said identified blobs for each of said plurality of actions;
determining whether at least one extracted feature of one of said plurality of actions provides a discrimination from all other of said plurality of actions;
when none of said extracted features of said one of said plurality of actions provides a discrimination from all other of said plurality of actions, providing a second sequence of learning video data for said one of said plurality of actions, said second sequence of learning video data captured under different conditions than said first sequence of learning video data, the different conditions including one or more of a different range and a different angle;
receiving a sequence of operational video data;
identifying and tracking blobs within said operational video data;
extracting one or more features from said identified blobs in said sequence of operational video data; and
comparing said at least one extracted feature of one of said plurality of actions and said one or more features from said sequence of operational video data.

16. The machine-readable medium of claim 15, wherein said comparison comprises a classifier design to determine whether said sequence of operational video data includes said at least one extracted feature.

17. The machine-readable medium of claim 16, wherein said classifier design includes one or more of a best fit equation, a hierarchical tree structure, and a summation of data clouds.

18. The machine-readable medium of claim 15, further comprising instructions for storing said at least one extracted feature of one of said plurality of actions.

19. The machine-readable medium of claim 18, further comprising instructions for:
receiving a plurality of sequences of operational video data;
extracting one or more features of an action from said plurality of sequences of operational video data;
determining that said one or more features of said action represent an action that is not identifiable as one of said plurality of actions; and
storing said extracted features of said action.

20. The machine-readable medium of claim 18, further comprising instructions for:
receiving a sequence of operational video data;
comparing said one or more features extracted from said learning video data for each of said plurality of actions with said sequence of operational video data; and
determining one or more features that best differentiate said sequence of operational video data from said learning video data.

* * * * *